United States Patent [19]

Mooradian

[11] 3,912,757
[45] Oct. 14, 1975

[54] 1,2,3,4-TETRAHYDRODIBENZOTHIOPHENE-1-CARBOXYLATES

[75] Inventor: Aram Mooradian, Schodack, N.Y.

[73] Assignee: Sterling Drug Inc., New York, N.Y.

[22] Filed: Aug. 28, 1972

[21] Appl. No.: 284,286

[52] U.S. Cl. ............. 260/330.5; 260/470; 424/275; 260/468 J; 260/609 D
[51] Int. Cl.² ..................................... C07D 333/64
[58] Field of Search .................................. 260/330.5

[56] References Cited
UNITED STATES PATENTS
3,678,076  7/1972  Crenshaw ...................... 260/330.5
3,803,180  4/1974  Berger et al .................. 260/346.2 M OTHER PUBLICATIONS
Rabindran et al., Chem. Abstracts, Vol. 48, p. 10725, (9–54).

*Primary Examiner*—Norma S. Milestone
*Assistant Examiner*—C. M. S. Jaisle
*Attorney, Agent, or Firm*—Frederik W. Stonner; B. Woodrow Wyatt

[57] ABSTRACT

Novel 1,2,3,4-tetrahydrodibenzothiophene-1-carboxylic acids and lower-alkyl esters thereof having antibacterial activity are prepared by reacting an appropriate thiophenol with 6-bromocyclohexanone-2-carboxylic acid methyl (or ethyl) ester and cyclization of the 6-(phenylthio)-cyclohexanone-2-carboxylic acid lower-alkyl ester so obtained. The corresponding free carboxylic acids are obtained by alkaline hydrolysis and can be esterified to give appropriate lower-alkyl esters.

8 Claims, No Drawings

1,2,3,4-TETRAHYDRODIBENZOTHIOPHENE-1-CARBOXYLATES

This invention relates to compositions of matter classified in the art of chemistry as 1,2,3,4-tetrahydrodibenzothiophenes.

the compounds of this invention are useful as antibacterial agents, more particularly being useful against *Staphylococcus aureus*.

The invention sought to be patented resides in the novel chemical compounds designated as $(Q_1)$-$(Q_2)$-1,2,3,4-tetrahydrodibenzothiophene-1-carboxylic acids and lower-alkyl esters thereof having in the free carboxylic acid and lower-alkyl ester forms the formula

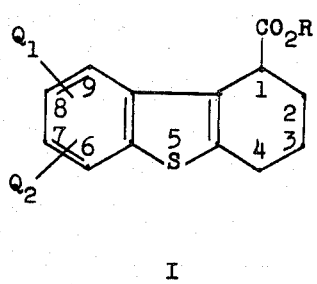

I wherein:

R is hydrogen or lower-alkyl;

$Q_1$ is selected from hydrogen, lower-alkyl, lower-alkoxy and halo;

and $Q_2$ is selected from hydrogen, lower-alkyl, lower-alkoxy, halo and phenyl.

A preferred group of compounds of this invention are the compounds having formula I where R and $Q_1$ each are hydrogen and $Q_2$ is selected from hydrogen, lower-alkyl, lower-alkoxy, halo and phenyl; and a more particularly preferred group of compounds are the compounds of formula I where R and $Q_1$ each are hydrogen and $Q_2$ is selected from halo and phenyl.

The novel compounds of this invention having formula I are prepared, where R is methyl or ethyl, by cyclization of the appropriate 6-[$(Q_1)$-$(Q_2)$-phenylthio]-2-$CO_2CH_3$ (or $CO_2CH_2CH_3$)-cyclohexanone (II) using a suitable dehydrating agent, and, where R is hydrogen, by alkaline hydrolysis of the carboxylic acid methyl or ethyl ester (I, R = $CH_3$ or $CH_2CH_3$) so obtained.

The cyclization can be carried out by heating cyclohexanone II, in a suitable solvent if desired, in the presence of a suitable acid, e.g., phosphoric acid, for several hours at about 60° to 100°C. The cyclization reaction is conveniently carried out by heating cyclohexanone II with 100% polyphosphoric acid at from 80° to 95°C. for from two to 6 hours.

The hydrolysis is carried out by heating the carboxylic acid methyl (or ethyl) ester (I, R = $CH_3$ or $CH_2CH_3$) in a suitable aqueous solvent, e.g., aqueous ethyl alcohol, with at least one equivalent of a suitable base, e.g., potassium and sodium hydroxide; the reaction is conveniently carried out by heating under reflux the ester in aqueous ethyl alcohol with an excess of sodium or potassium hydroxide for about 2 to 6 hours.

The intermediate 6-[$(Q_1)$-$(Q_2)$-phenylthio]-2-$CO_2CH_3$ (or $CO_2CH_2CH_3$)-cyclohexanone (II) is readily prepared by reacting the known 6-bromo-2-$CO_2CH_3$ (or $CO_2CH_2CH_3$)-cyclohexanone (III) with the appropriate $(Q_1)$-$(Q_2)$-thiophenol (IV) in a suitable solvent, e.g., a ketone such as acetone, in the presence of at least one equivalent of a suitable acid acceptor for several hours at elevated temperatures; the reaction is conveniently carried out by heating under reflux a solution of equivalent amounts of bromocyclohexanone III and thiophenol IV in the presence of two to four equivalents of potassium carbonate for about 8 hours.

The intermediate $(Q_1)$-$(Q_2)$-thiophenols (IV) are known compounds or are readily prepared from known anilines using standard procedures, e.g., the Leuckart thiophenol reaction. Thus an appropriate aniline is diazotized using sodium nitrite in concentrated hydrochloric acid, the resulting diazonium chloride is treated in water with potassium ethyl xanthate, and the resulting phenyl xanthate is hydrolyzed with aqueous alkali, or alternatively, is reduced with lithium aluminum hydride, to give the corresponding thiophenol.

The compounds of formula I where R is lower-alkyl are prepared from the corresponding carboxylic acids (formula I, R = H) using standard esterification procedures, e.g., by conversion of the carboxylic acid on treatment with thionyl chloride to the corresponding carboxylic acid chloride and treatment of the latter with the appropriate alcohol, preferably in the presence of an acid acceptor such as pyridine or triethylamine.

The preparation of the compounds of formula I is illustrated in the following flow chart:

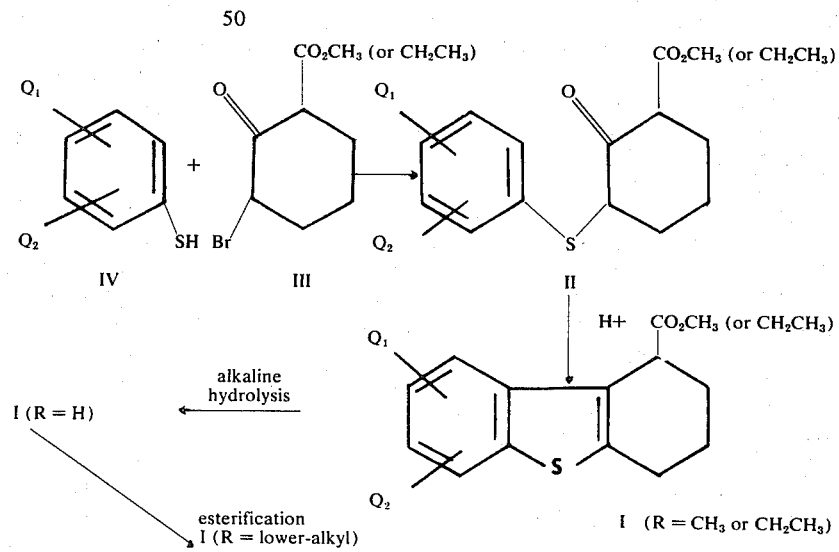

As used throughout this specification, the terms lower-alkyl and lower-alkoxy mean such groups containing from one to six carbon atoms which can be arranged as straight or branched chains, and, without limiting the generality of the foregoing, are illustrated by methyl, ethyl, propyl, isopropyl, butyl, sec-butyl, tert-butyl, amyl, hexyl and the like for lower-alkyl; and methoxy, ethoxy, propoxy, isobutoxy, tert-butoxy, hexyloxy and the like for lower-alkoxy.

As used throughout this specification the term halo means chloro, bromo, iodo and fluoro.

It will be understood that the substituents $Q_1$ and $Q_2$ as hereinbefore defined can each occur at any one of the available carbon atoms at the 6, 7, 8 and 9 positions of the compounds of formula I and when there are two such substituents they can occur in any position combination relative to each other.

The compounds of formula I have been found to possess antibacterial activity, thus indicating usefulness of the compounds of formula I as antibacterial agents. The compounds of formula I where R is methyl or ethyl are of course additionally useful as intermediates for the preparation of the compounds of formula I where R is hydrogen or lower-alkyl.

The antibacterial activity was determined using a modification of the Autotiter[R] method described by Goss et al., Applied Microbiology 16 (No. 9), 1414–1416 (1968) in which a 1000 mcg./ml. solution of the test compound is prepared. To the first cup of the Autotray[R] is added 0.1 ml. of the test solution. Activation of the Autotiter initiates a sequence of operations by which 0.5 ml. of the test compound solution is withdrawn from this cup by a Microtiter[R] transfer loop and diluted in 0.05 ml. of sterile semi-synthetic medium (glucose). After this operation, 0.5 ml. of inoculated semisynthetic medium is added automatically to each cup. The overall operation results in final drug concentrations ranging from 500 to 0.06 mcg./ml. in twofold decrements. The Autotray is incubated for 18–20 hours at 37°C., at which time the trays are examined visually for growth as evidenced by turbidity, and the concentration of the last sample in the series showing no growth (or no turbidity) is recorded as the minimal inhibitory concentration (MIC). The compounds of formula I were thus found to be antibacterially effective against Staphylococcus aureus at concentrations from 31.3 to 500 mcg./ml.

The free acid forms of the compounds of formula I where R is hydrogen are convertible to the corresponding salt forms by interaction of a particular acid with a base, and such salts are considered to be the full equivalents of the acids and esters of formula I. Examples of such salts are salts of heavy metals such as zinc and iron; alkali metal salts, for example, sodium and potassium; alkali earth metal salts, for example, calcium and barium; the aluminum and magnesium salts; and ammonium salts, such as those derived from ammonia or amines such as methylamine, ethylamine, isopropylamine, hexylamine, dimethylamine, diethylamine, methyl ethylamine, di(sec-propyl)amine, dihexylamine, methyl cyclohexylamine, pyrrolidine, piperidine, morpholine, choline, glucosamine, 2-hydroxyethylamine, bis(2-hydroxyethyl)amine, tris(2-hydroxy-ethyl)amine and the like. Of course when the compounds of formula I are to be used for application to warm blooded animals, the preferred salts are the pharmaceutically acceptable salts and such salts are considered to be the full equivalents, particularly for pharmaceutical use, of the free acids and esters of formula I.

In use, the compounds can be formulated by preparing a dilute solution in an aqueous medium or in a solution containing a surfactant, or alternatively in an organic medium in which the compounds are soluble, for example ethyl alcohol, and are applied to a surface to be disinfected by conventional means such as spraying, swabbing immersion, and the like. Alternatively the compounds can be formulated as ointments or creams by incorporating them in conventional ointment or cream bases, for example alkylpolyether alcohols, cetyl alcohol, stearyl alcohol, and the like, or as jellies by incorporating them in conventional jelly bases as glycerol and tragacanth. They can also be formulated for use as aerosol sprays or foams.

The molecular structures of the compounds of my invention were assigned on the basis of study of their infrared, and NMR spectra, and confirmed by the corresponding between calculated and found values for the elementary analyses for representative examples.

The following examples will further illustrate the invention without, however, limiting it thereto.

EXAMPLE 1

*a.* 4-Phenylthiophenol

To a stirred suspension of 103 g. of 4-phenylaniline in 200 ml. of concentrated hydrochloric acid, cooled to 0°C., was added dropwise a solution of 39 g. of sodium nitrite in 80 ml. water and stirring was continued 1 hour. The solution was filtered and the filtrate was added dropwise to a stirred solution of 150 g. of potassium ethyl xanthate in 190 ml. of water while the temperature was maintained at 40° to 45°C. The solution was extracted with ether and the ether extract was washed with 100 ml. of 10% sodium hydroxide and dried. To this solution was added dropwise with stirring a suspension of 22 g. of lithium aluminum hydride in 1200 ml. of tetrahydrofuran at a rate which maintained gentle reflux and stirring was continued for 1 hour. The mixture was cautiously treated dropwise with 180 ml. of water, 600 ml. of 10% sulfuric acid was added and the organic layer was separated, washed with water, dried, and evaporated to dryness under reduced pressure to give, after crystallization from ethyl alcohol, 55 g. of 4-phenylthiophenol.

*b.* 6-(4-Biphenylylthio)-2-carbethoxycyclohexanone

A mixture of 55 g. of 4-phenylthiophenol, 74 g. of 6-bromo-2-carbethoxycyclohexanone and 140 g. of potassium carbonate in 1300 ml. of acetone were heated under reflux for 8 hours. The mixture was filtered and the filtrate was evaporated to dryness under reduced pressure to give 95 g. of oily 6-(4-biphenylylthio)-2-carbethoxycyclohexanone.

*c.* Ethyl 8-Phenyl-1,2,3,4-tetrahydrodibenzothiophene-1-carboxylate

A mixture of 211 g. of phosphorus pentoxide and 175 g. of 85% phosphoric acid was heated on a steam bath for 1 hour. To the resulting syrupy 100% phosphoric acid was added 95 g. of 6-(4-biphenylylthio)-2-carbethoxycyclohexanone and the resulting solution was heated on a steam bath with stirring for 4 hours. Ice and water were added to the solution, stirring was continued for ½ hour and the solution was extracted with ether. The ether extract was dried and evaporated to dryness to give ethyl 8-phenyl-1,2,3,4-tetrahydrodibenzothiophene-1-carboxylate.

d. 8-Phenyl-1,2,3,4-tetrahydrodibenzothiophene-1-carboxylic acid

A solution of the ethyl 8-phenyl-1,2,3,4-tetrahydrodibenzothiophene-1-carboxylate, from step c above, in 500 ml. of absolute ethyl alcohol and 200 ml. of 10% potassium hydroxide was heated under reflux for 6 hours. The solution was evaporated to dryness under reduced pressure and a solution of the resulting residue in water was acidified. The resulting precipitate was collected and redissolved in dilute potassium hydroxide. This solution was extracted with ether, acidified with dilute hydrochloric acid and extracted with ether. The ether extract was washed with water, dried, and evaporated to dryness. The resulting solid residue was triturated with benzene, filtered, and recrystallized from xylene to give 25.1 g. of 8-phenyl-1,2,3,4-tetrahydrodibenzothiophene-1-carboxylic acid; m.p. 206°–208°C.

EXAMPLE 2 a. 2-Phenylthiophenol

Following the sequence of procedural steps similar to those described in Example 1a and using equivalent amounts of the appropriate reagents there was obtained from 10 g. of 2-phenylaniline 43.2 g. of b 2-phenylthiophenol; b.p. 141°–150°C. (15 mm).

b. 6-(2-Biphenylylthio)-2-carbethoxycyclohexanone

Following a procedure similar to that described in Example 1b and using 43.2 g. of 2-phenylthiophenol, 58 g. of 6-bromo-2-carbethoxycyclohexanone, 110 g. of potassium carbonate and 1000 ml. of acetone there was obtained 87 g. of oily 6-(2-biphenylylthio)-2-carbethoxycyclohexanone.

c. Ethyl 6-Phenyl-1,2,3,4-tetrahydrodibenzothiophene-1-carboxylate

Following a procedure similar to that described in Example 1c and using 193 g. of phosphorus pentoxide, 160 g. of 85% phosphoric acid and 87 g. of 6-(2-biphenylylthio)-2-carbethoxycyclohexanone there was obtained 65 g. of oily ethyl 6-phenyl-1,2,3,4-tetrahydrodibenzothiophene-1-carboxylate.

d. 6-Phenyl-1,2,3,4-tetrahydrodibenzothiophene-1-carboxylic acid

Following a procedure similar to that described in Example 1d and using 18.8 g. of ethyl 6-phenyl-1,2,3,4-tetrahydrodibenzothiophene-1-carboxylate in 200 ml. of absolute alcohol and 50 ml. of 10% sodium hydroxide there was obtained 7.7 g. of 6-phenyl-1,2,3,4-tetrahydrodibenzothiophene-1-carboxylic acid, m.p. 207°–209°C. (isopropyl alcohol).

EXAMPLE 3 a. 6-(4-Tolylthio)-2-carboxycyclohexanone methyl (and ethyl) ester (mixture)

Following a procedure similar to that described in Example 1b and using 34.6 g. of 4-methylthiophenol, 68 g. of 6-bromo-2-carboxycyclohexanone methyl (and ethyl) ester (mixture) and 138 g. of potassium carbonate in 1000 ml. of acetone there was obtained 70 g. of a mixture of oily 6-(4-tolylthio)-2-carboxycyclohexanone methyl and ethyl ester.

b. Methyl (and Ethyl) 8-Methyl-1,2,3,4-tetrahydrodibenzothiophene-1-carboxylate (mixture)

Following a procedure similar to that described in Example 1c and using 52.5 g. of a mixture of 6-(4-tolylthio)-2-carboxycyclohexanone methyl and ethyl ester, 105 g. of phosphorus pentoxide and 105 g. of 85% phosphoric acid there was obtained 47 g. of a mixture of methyl and ethyl 8-methyl-1,2,3,4-tetrahydrodibenzothiophene-1-carboxylate.

c. 8-Methyl-1,2,3,4-tetrahydrodibenzothiophene-1-carboxylic acid

Following a procedure similar to that described in Example 1d and using 47 g. of a mixture of methyl and ethyl 8-methyl-1,2,3,4-tetrahydrodibenzothiophene-1-carboxylate in aqueous ethyl alcohol containing 13 g. of potassium hydroxide there was obtained 16.3 g. of 8-methyl-1,2,3,4-tetrahydrodibenzothiophene-1-carboxylic acid, m.p. 189°–191°C. (ethyl acetate).

EXAMPLE 4 a. 6-(4-Chlorophenylthio)-2-carbethoxycyclohexanone

Following a procedure similar to that described in Example 1b and using 36.1 g. of 4-chlorothiophenol, 62.3 g. of 6-bromo-2-carbethoxycyclohexanone and 138 g. of potassium carbonate in 1000 ml. of acetone there was obtained 82 g. of oily 6-(4-chlorophenylthio)-2-carbethoxycyclohexanone.

b. Ethyl 8-Chloro-1,2,3,4-tetrahydrodibenzothiophene-1-carboxylate

Following a procedure similar to that described in Example 1c and using 82 g. of 6-(4-chlorophenylthio)-2-carbethoxycyclohexanone, 165 g. of phosphorus pentoxide and 165 g. of 85% polyphosphoric acid there was obtained 80 g. of ethyl 8-chloro-1,2,3,4-tetrahydrodibenzothiophene-1-carboxylate.

c. 8-Chloro-1,2,3,4-tetrahydrodibenzothiophene-1-carboxylic acid

Following a procedure similar to that described in Example 1d and using 55 g. of ethyl 8-chloro-1,2,3,4-tetrahydrodibenzothiophene-1-carboxylate and 15 g. of potassium hydroxide in aqueous alcohol there was obtained 15 g. of 8-chloro-1,2,3,4-tetrahydrodibenzothiophene-1-carboxylic acid, m.p. 146°–148°C. (benzene).

8-Phenyl-1,2,3,4-tetrahydrodibenzothiophene-1-carboxylic acid and 8-methyl-1,2,3,4-tetrahydrodibenzothiophene-1-carboxylic acid, when tested for antibacterial activity using the test procedure hereinbefore described, were also found to be antibacterially effective against *Pseudomonas aeruginosa* at 125 mcg./ml. and 500 mcg./ml. respectively.

Conversion of the free carboxylic acids of formula I where R is hydrogen to the corresponding lower-alkyl esters (R = lower-alkyl) is accomplished by the following general procedure:

The appropriate carboxylic acid and an excess of thionyl chloride, if desired in an inert solvent such as chloroform, are warmed gently for about one hour and the solution is evaporated to dryness. The residual corresponding carboxylic acid chloride is dissolved in an inert solvent, e.g., chloroform, and treated with an excess of the appropriate lower-alkyl alcohol (ROH; R H) in the presence of an equivalent of an acid acceptor, e.g., pyridine or triethylamine. The solvent is removed by evaporation under reduced pressure and the carboxylic acid lower-alkyl ester (formula I, R = lower-alkyl) is isolated and purified by standard procedures.

Following the general esterification procedure described hereinabove and using 8-phenyl-1,2,3,4-tetrahydrodibenzothiophene-1-carboxylic acid there is obtained 8-phenyl-1,2,3,4-tetrahydrodibenzothiophene-1-carboxylic acid chloride which on reaction with methyl alcohol, isopropyl alcohol, tert-butyl alcohol and hexyl alcohol gives respectively:
5. methyl 8-phenyl-1,2,3,4-tetrahydrodibenzothiophene-1-carboxylate;
6. isopropyl 8-phenyl-1,2,3,4-tetrahydrodibenzothiophene-1-carboxylate;
7. tert-butyl 8-phenyl-1,2,3,4-tetrahydrodibenzothiophene-1-carboxylate; and
8. hexyl 8-phenyl-1,2,3,4-tetrahydrodibenzothiophene-1-carboxylate.

Following a procedure similar to that described hereinbefore for Example 1b and substituting for 4-phenylthiophenol an equivalent amount of the following:
9. 4-fluorothiophenol;
10. 2-fluorothiophenol;
11. 2-iodothiophenol;
12. 2,3-dichlorothiophenol;
13. 2,5-dibromothiophenol;
14. 2,4-difluorothiophenol;
15. 4-hexylthiophenol;
16. 4-tert-butylthiophenol;
17. 2,5-dihexylthiophenol;
18. 4-hexyloxythiophenol;
19. 4-isopropoxythiophenol;
20. 4-methoxythiophenol;
21. 5-ethyl-2-methoxythiophenol;
22. 2-bromo-5-methylthiophenol; and
23. 2-bromo-4-methoxythiophenol
there are obtained respectively the following:
9a. 6-(4-fluorophenylthio)-2-carbethoxycyclohexanone;
10a. 6-(2-fluorophenylthio)-2-carbethoxycyclohexanone;
11a. 6-(2-iodophenylthio)-2-carbethoxycyclohexanone;
12a. 6-(2,3-dichlorophenylthio)-2-carbethoxycyclohexanone;
13a. 6-(2,5-dibromophenylthio)-2-carbethoxycyclohexanone;
14a. 6-(2,4-difluorophenylthio)-2-carbethoxycyclohexanone;
15a. 6-(4-hexylphenylthio)-2-carbethoxycyclohexanone;
16a. 6-(4-tert-butylphenylthio)-2-carbethoxycyclohexanone;
17a. 6-(2,5-dihexylphenylthio)-2-carbethoxycyclohexanone;
18a. 6-(4-hexyloxyphenylthio)-2-carbethoxycyclohexanone;
19a. 6-(4-isopropoxyphenylthio)-2-carbethoxycyclohexanone;
20a. 6-(4-methoxyphenylthio)-2-carbethoxycyclohexanone;
21a. 6-(5-ethyl-2-methoxyphenylthio)-2-carbethoxycyclohexanone;
22a. 6-(2-bromo-5-methylphenylthio)-2-carbethoxycyclohexanone; and
23a. 6-(2-bromo-4-methoxyphenylthio)-2-carbethoxycyclohexanone.

Following a procedure similar to that described hereinbefore for Example 1c and substituting for 6-(4-biphenylylthio)-2-carbethoxycyclohexanone an equivalent amount of the carbethoxycyclohexanones 9a to 23a inclusive above there are obtained:
9b. Ethyl 8-fluoro-1,2,3,4-tetrahydrodibenzothiophene-1-carboxylate;
10b. Ethyl 6-fluoro-1,2,3,4-tetrahydrodibenzothiophene-1-carboxylate;
11b. Ethyl 6-iodo-1,2,3,4-tetrahydrodibenzothiophene-1-carboxylate;
12b. Ethyl 6,7-dichloro-1,2,3,4-tetrahydrodibenzothiophene-1-carboxylate;
13b. Ethyl 6,9-dibromo-1,2,3,4-tetrahydrodibenzothiophene-1-carboxylate;
14b. Ethyl 6,8-difluoro-1,2,3,4-tetrahydrodibenzothiophene-1-carboxylate;
15b. Ethyl 8-hexyl-1,2,3,4-tetrahydrodibenzothiophene-1-carboxylate;
16b. Ethyl 8-tert-butyl-1,2,3,4-tetrahydrodibenzothiophene-1-carboxylate;
17b. Ethyl 6,9-dihexyl-1,2,3,4-tetrahydrodibenzothiophene-1-carboxylate;
18b. Ethyl 8-hexyloxy-1,2,3,4-tetrahydrodibenzothiophene-1-carboxylate;
19b. Ethyl 8-isopropoxy-1,2,3,4-tetrahydrodibenzothiophene-1-carboxylate;
20b. Ethyl 8-methoxy-1,2,3,4-tetrahydrodibenzothiophene-1-carboxylate;
21b. Ethyl 9-ethyl-6-methoxy-1,2,3,4-tetrahydrodibenzothiophene-1carboxylate;
22b. Ethyl 6-bromo-9-methyl-1,2,3,4-tetrahydrodibenzothiophene-1-carboxylate; and
23b. Ethyl 6-bromo-8-methoxy-1,2,3,4-tetrahydrodibenzothiophene-1-carboxylate.

Following a procedure similar to that described hereinbefore for Example 1d and substituting for ethyl 8-phenyl-1,2,3,4-tetrahydrodibenzothiophene-1-carboxylate an equivalent amount of the ethyl carboxylates 9b to 23b inclusive above there are obtained:
9c. 8-fluoro-1,2,3,4-tetrahydrodibenzothiophene-1-carboxylic acid;
10c. 6-fluoro-1,2,3,4-tetrahydrodibenzothiophene-1-carboxylic acid;
11c. 6-iodo-1,2,3,4-tetrahydrodibenzothiophene-1-carboxylic acid;
12c. 6,7-dichloro-1,2,3,4-tetrahydrodibenzothiophene-1-carboxylic acid;
13c. 6,9-dibromo-1,2,3,4-tetrahydrodibenzothiophene-1-carboxylic acid;
14c. 6,8-difluoro-1,2,3,4-tetrahaydrodibenzothiophene-1-carboxylic acid;
15c. 8-hexyl-1,2,3,4-tetrahydrodibenzothiophene-1-carboxylic acid;
16c. 8-tert-butyl-1,2,3,4-tetrahydrodibenzothiophene-1-carboxylic acid;
17c. 6,9-dihexyl-1,2,3,4-tetrahydrodibenzothiophene-1-carboxylic acid;
18c. 8-hexyloxy-1,2,3,4-tetrahydrodibenzothiophene-1-carboxylic acid;
19c. 8-isopropoxy-1,2,3,4-tetrahydrodibenzothiophene-1-carboxylic acid;
20c. 8-methoxy-1,2,3,4-tetrahydrodibenzothiophene-1-carboxylic acid;
21c. 9-ethyl-6-methoxy-1,2,3,4-tetrahydrodibenzothiophene-1-carboxylic acid;
22c. 6-bromo-9-methyl-1,2,3,4-tetrahydrodibenzothiophene-1-carboxylic acid; and
23c. 6-bromo-8-methoxy-1,2,3,4-tetrahydrodibenzothiophene-1-carboxylic acid.

I claim:
1. A compound having the formula

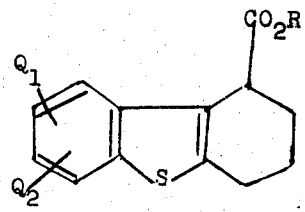

wherein R and $Q_1$ each are hydrogen; and $Q_2$ is selected from halo and phenyl.

2. 8-Phenyl-1,2,3,4-tetrahydrodibenzothiophene-1-carboxylic acid according to claim 1.
3. 6-Phenyl-1,2,3,4-tetrahydrodibenzothiophene-1-carboxylic acid according to claim 1.
4. 8-Chloro-1,2,3,4-tetrahydrodibenzothiophene-1-carboxylic acid according to claim 1.
5. 8-Methyl-1,2,3,4-tetrahydrodibenzothiophene-1-carboxylic acid.
6. Ethyl 8-phenyl-1,2,3,4-tetrahydrodibenzothiophene-1-carboxylate.
7. Ethyl 6-phenyl-1,2,3,4-tetrahydrodibenzothiophene-1-carboxylate.
8. Ethyl 8-chloro-1,2,3,4-tetrahydrodibenzothiophene-1-carboxylate.

* * * * *

UNITED STATES PATENT AND TRADEMARK OFFICE
CERTIFICATE OF CORRECTION

PATENT NO. : 3,912,757
DATED : October 14, 1975
INVENTOR(S) : Aram Mooradian

It is certified that error appears in the above–identified patent and that said Letters Patent are hereby corrected as shown below:

Column 3, line 32, "0.5" should read -- 0.05 --.

Column 3, line 35, "0.5" should read -- 0.05 --.

Column 4, lines 19-20, "corresponding" should read -- correspondence --.

Signed and Sealed this

Twenty-third Day of November 1976

[SEAL]

Attest:

RUTH C. MASON
Attesting Officer

C. MARSHALL DANN
Commissioner of Patents and Trademarks